(12) United States Patent
Kusada et al.

(10) Patent No.: US 11,472,312 B2
(45) Date of Patent: Oct. 18, 2022

(54) ELECTRICALLY DRIVEN VEHICLE

(71) Applicant: TOYOTA JIDOSHA KABUSHIKI KAISHA, Toyota (JP)

(72) Inventors: Masaki Kusada, Toyota (JP); Tomoko Oba, Toyota (JP); Yusuke Mamada, Toyota (JP); Abhilasha Sumangal Devaraj, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 417 days.

(21) Appl. No.: 16/718,366

(22) Filed: Dec. 18, 2019

(65) Prior Publication Data

US 2020/0238850 A1 Jul. 30, 2020

(30) Foreign Application Priority Data

Jan. 25, 2019 (JP) .............................. JP2019-010723

(51) Int. Cl.
  *B60L 58/27* (2019.01)
  *B60W 20/12* (2016.01)
  (Continued)

(52) U.S. Cl.
  CPC ............... *B60L 58/27* (2019.02); *B60L 53/62* (2019.02); *B60W 20/12* (2016.01); *G08G 1/205* (2013.01);
  (Continued)

(58) Field of Classification Search
  CPC .. B60L 2200/24; B60L 2260/58; B60L 53/62; B60L 58/27; B60W 20/12; B60W 2050/0064; B60W 2556/45; B60W 2556/50; B60W 2710/246; B60W 30/194; B60Y 2200/91; G08G 1/205; Y02T 10/70; Y02T 10/7072; Y02T 90/12; Y02T 90/16

See application file for complete search history.

(56) References Cited

U.S. PATENT DOCUMENTS 9,073,405 B2 * 7/2015 Choi ................... F02N 11/0807
9,834,114 B2 * 12/2017 Hettrich ................. B60L 58/27
(Continued)

FOREIGN PATENT DOCUMENTS

JP   2010-110196 A   5/2010
JP   2012-080630 A   4/2012

*Primary Examiner* — Tyler J Lee
(74) *Attorney, Agent, or Firm* — Sughrue Mion, PLLC

(57) ABSTRACT

There is provided an electrically driven vehicle used for a car sharing system and configured to appropriately increase the temperature of a power storage device. The electrically driven vehicle used for the car sharing system is provided with a power storage device and a temperature raising device configured to increase temperature of the power storage device. When a user operates a communication device to make a direct reservation or an indirect reservation of the electrically driven vehicle for driving, the electrically driven vehicle estimates a driving start time of the vehicle, based on the position of the communication device, sets a temperature-rising start time of the power storage device, based on the temperature of the power storage device and the estimated driving start time, and controls the temperature raising device to start a temperature increase of the power storage device at the set temperature-rising start time.

12 Claims, 4 Drawing Sheets

(51) Int. Cl.
  *B60L 53/62* (2019.01)
  *G08G 1/00* (2006.01)
(52) U.S. Cl.
  CPC ...... *B60L 2200/24* (2013.01); *B60W 2556/50* (2020.02)

(56) References Cited

U.S. PATENT DOCUMENTS

| | | | |
|---|---|---|---|
| 10,369,899 B2* | 8/2019 | Hettrich | H04W 4/029 |
| 2009/0243538 A1* | 10/2009 | Kelty | H01M 10/615 |
| | | | 320/104 |
| 2010/0019728 A1* | 1/2010 | Ichikawa | B60L 58/12 |
| | | | 320/134 |
| 2013/0103240 A1* | 4/2013 | Sato | H02J 7/007192 |
| | | | 701/22 |
| 2013/0298586 A1* | 11/2013 | Hwang | B60L 3/0046 |
| | | | 429/61 |
| 2014/0114532 A1* | 4/2014 | Choi | G08G 1/167 |
| | | | 701/36 |
| 2016/0059733 A1* | 3/2016 | Hettrich | H04W 4/029 |
| | | | 701/2 |
| 2017/0238258 A1* | 8/2017 | Ramalho de Oliveira | |
| | | | H04W 52/0261 |
| | | | 455/574 |
| 2017/0305294 A1* | 10/2017 | Hettrich | H04W 4/029 |
| 2018/0001774 A1* | 1/2018 | Murata | H02J 7/007 |
| 2018/0268626 A1* | 9/2018 | Arashima | G07C 5/0858 |
| 2018/0334170 A1* | 11/2018 | Liu | B60W 10/30 |
| 2019/0315232 A1* | 10/2019 | Ing | B60L 58/26 |
| 2021/0097315 A1* | 4/2021 | Carruthers | H04W 4/40 |

* cited by examiner

ELECTRICALLY DRIVEN VEHICLE

CROSS-REFERENCE TO RELATED APPLICATION

This application claims priority to Japanese Patent Application No. 2019-010723 filed on Jan. 25, 2019, the contents of which is incorporated herein by reference.

TECHNICAL FIELD

The present disclosure relates to an electrically driven vehicle.

BACKGROUND

An electrically vehicle is generally provided with a battery and a charger and is configured to selectively perform ordinary charging or quick charging that generates a larger heat in the battery in the process of using an external power supply to charge the battery via the charger. When a driver sets a driving start time, a proposed configuration of the electrically driven vehicle determines a battery warm-up start time prior to the driving start time and controls the charger to start quick charging at the determined battery warm-up start time (as described in, for example, JP 2010-110196A). This electrically driven vehicle performs such control to efficiently warm up the battery by the simple configuration.

CITATION LIST

Patent Literature

PTL 1: JP2010-110196A

When the electrically driven vehicle described above is used for a car sharing system, an unspecified user makes a reservation of the electrically driven vehicle for driving. In some procedure of making such a reservation, however, the user may not be required to set a driving start time. In this case, since the driving start time is unknown, it is impossible to warm up the battery at the timing when the user start driving the electrically driven vehicle.

A main object of an electrically driven vehicle of the present disclosure used for a car sharing system is to appropriately increase temperature of a power storage device.

SUMMARY

In order to achieve the above primary object, the electrically driven vehicle of the disclosure is implemented by an aspect described below.

The present disclosure is directed to an electrically driven vehicle. The electrically driven vehicle used for car sharing system includes a power storage device, a temperature raising device configured to increase temperature of the power storage device, and a control device configured to control the temperature raising device. When a user operates a communication device to make a direct reservation or an indirect reservation of the electrically driving vehicle for driving, the control device estimates a driving start time of the vehicle, based on a position of the communication device, sets a temperature-rising start time of the power storage device, based on a temperature of the power storage device and the estimated driving start time, and controls the temperature raising device to start a temperature increase of the power storage device at the set temperature-rising start time.

When the user operates the communication device to make a direct reservation or an indirect reservation of the electrically driven vehicle for driving, the electrically driven vehicle estimates the driving start time of the vehicle, based on the position of the communication device, sets the temperature-rising start time of the power storage device, based on the temperature of the power storage device and the estimated driving start time, and controls the temperature raising device to start a temperature increase of the power storage device at the set temperature-rising start time. This configuration enables the temperature of the power storage device to be increased appropriately in the case where an unspecified user makes a reservation of the electrically driven vehicle for driving without setting the driving star time. The "communication device" herein may be, for example, a cellular phone, a smartphone, a tablet terminal or a personal computer.

DESCRIPTION OF EMBODIMENTS

The following describes some aspects of the present disclosure with reference to an embodiment.

Figure 1:
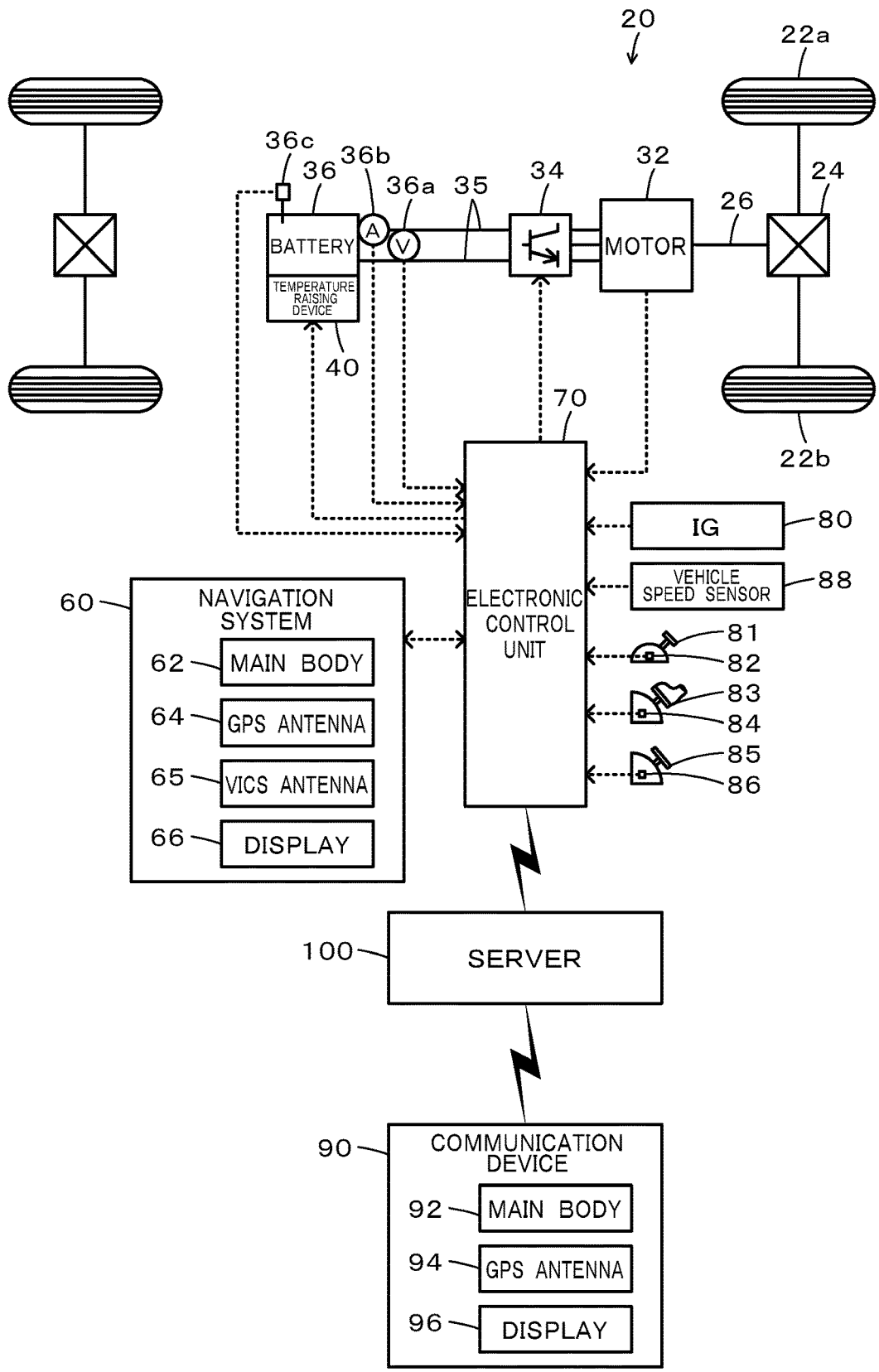
FIG. 1 is a configuration diagram illustrating the schematic configuration of an electric vehicle according to one embodiment of the present disclosure.

FIG. 1 is a configuration diagram illustrating the schematic configuration of an electric vehicle 20 according to one embodiment of the present disclosure. As illustrated, the electric vehicle 20 of the embodiment includes a motor 32, an inverter 34, a battery 36 serving as a power storage device, a temperature raising device 40, a navigation system 60 and an electronic control unit 70.

The motor 32 is configured as, for example, a synchronous generator motor and includes a rotor that is connected with a driveshaft 26 which is coupled with drive wheels 22*a* and 22*b* via a differential gear 24. The inverter 34 is used to drive the motor 32 and is connected with the battery 36 via power lines 35. The electronic control unit 70 performs switching control of a plurality of switching elements (not shown) included in the inverter 34, so as to rotate and drive the motor 32.

The battery 36 is configured as, for example, a lithium ion rechargeable battery or a nickel metal hydride battery. The temperature raising device 40 is configured as a heater to increase the temperature of the battery 36 by using electric power from an auxiliary machine battery (not shown).

The navigation system 60 includes a main body 62, a GPS antenna 64, a VICS (registered trademark) antenna 65, and a display 66. The main body 62 includes a CPU, a ROM, a RAM, a storage medium, input and output ports and a communication port, although not being specifically illustrated. For example, map information is stored in the storage medium of the main body 62. The map information includes, for example, service information (for example, sightseeing information and parking places) and road information of respective drive sections (for example, between traffic lights or between intersections) stored in the form of a database. The road information includes, for example, distance information, road width information, number of lane information, district information (for example, an urban district or a suburban district), road type information (for example, a local street or an express way), road grade information, a legal speed limit, and the number of traffic lights. The GPS antenna 64 is configured to receive information with regard to a current location of the vehicle. The VICS (registered trademark) antenna 65 is configured to receive weather information, traffic congestion information, traffic control information, disaster information and the like from information centers. The display 66 is configured as a touch panel display to display various pieces of information, for example, information with regard to the current location of the vehicle and a scheduled drive route to a destination, and to allow the user to enter various instructions. The navigation system 60 is connected with the electronic control unit 70 via the respective communication ports.

The electronic control unit 70 includes a CPU, a ROM, a RAM, input and output ports and a communication port although not being specifically illustrated. Signals from various sensors are input into the electronic control unit 70 via the input port. The signals input into the electronic control unit 70 include, for example, a rotation position θm of the rotor of the motor 32 from a rotation position sensor (not shown) configured to detect the rotation position of the rotor of the motor 32, and phase currents Iu, Uv and Iw of the respective phases of the motor 32 from a current sensor (not shown) configured to detect the phase currents of the respective phases of the motor 32. The input signals also include a voltage Vb of the battery 36 from a voltage sensor 36 placed between terminals of the battery 36, an electric current Ib of the battery 36 from a current sensor 36b mounted to an output terminal of the battery 36, and a temperature Tb of the battery 36 from a temperature sensor 36c mounted to the battery 36. Furthermore, the input signals include an ignition signal from an ignition switch 80 and a shift position SP from a shift position sensor 82 configured to detect an operating position of a shift lever 81. The input signals also include an accelerator position Acc from an accelerator pedal position sensor 84 configured to detect a depression amount of an accelerator pedal 83, a brake pedal position BP from a brake pedal position sensor 86 configured to detect a depression amount of a brake pedal 85, and a vehicle speed V from a vehicle speed sensor 88.

Various control signals are output from the electronic control unit 70 via the output port. The signals output from the electronic control unit 70 include, for example, control signals to the inverter 34 and control signals to the temperature raising device 40. The electronic control unit 70 calculates a rotation speed Nm of the motor 32, based on the rotation position Om of the rotor of the motor 32 input from the rotation position detection sensor. The electronic control unit 70 also calculates a state of charge SOC of the battery 36, based on an integrated value of the electric current Ib of the battery 36 input from the current sensor 36b. The electronic control unit 70 further calculates an input limit Win and an output limit Wout of the battery 36, based on the calculated state of charge SOC and the temperature Tb of the battery 36 input from the temperature sensor 36c. The state of charge SOC herein denotes a ratio of the amount of electric power dischargeable from the battery 36 to the overall capacity of the battery 36. The input limit Win and the output limit Wout herein denote maximum electric powers chargeable into and dischargeable from the battery 36.

The electronic control unit 70 is connected with the navigation system 60 via the respective communication ports as described above. The electronic control unit 70 is also configured to make communication with a communication device 90 via a server 100. The communication device 90 is, for example, a cellular phone, a smartphone, a tablet terminal or a personal computer.

The communication device 90 includes a main body 92, a GPS antenna 94, and a display 96. The main body 92 includes a CPU, a ROM, a RAM, a storage medium, input and output ports, and a communication port, although not being specifically illustrated. For example, map information that is similar to the map information stored in the storage medium of the main body 62 of the navigation system 60, and application software for a car sharing system (system that causes one vehicle to be shared by a plurality of users) are stored in the storage medium of the main body 92. The GPS antenna 94 is configured to receive information with regard to the position of the communication device 90. The display 96 is configured as a touch panel display. The communication device 90 enables each user to make a reservation of the electric vehicle 20 for driving via the server 100 by the application software for the car sharing system.

In the electric vehicle 20 of the embodiment having the configuration described above, the electronic control unit 70 sets a required torque Td* that is required for driving (required for the driveshaft 26), based on the accelerator position Acc and the vehicle speed V and sets a torque command Tm* of the motor 32 such that the required torque Td* is output to the driveshaft 26 within a range of the input limit Win and the output limit Wout of the battery 36. The electronic control unit 70 then performs switching control of the plurality of switching elements included in the inverter 34, such as to drive the motor 32 with the torque command Tm*.

Figure 2:
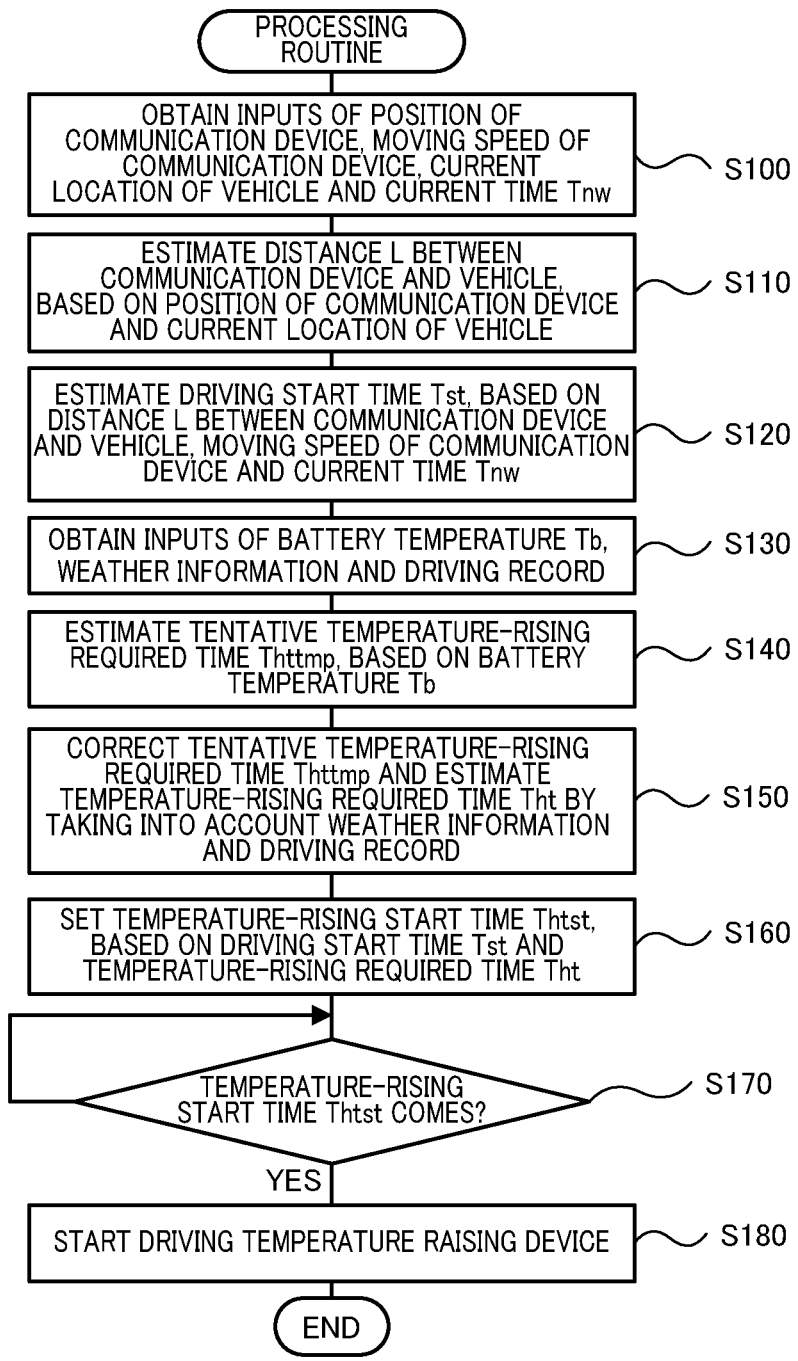
FIG. 2 is a flowchart showing one example of a processing routine performed by an electronic control unit according to the embodiment.

The following describes operations of the electric vehicle 20 of the embodiment having the configuration described above or more specifically a series of operations when the user operates the communication device 90 to make a reservation of the electric vehicle 20 for driving via the server 100. FIG. 2 is a flowchart showing one example of a processing routine performed by the electronic control unit 70. This routine is performed when the user operates the communication device 90 to make a reservation of the electric vehicle 20 for driving via the server 100 and there is a need to increase the temperature of the battery 36 prior to a start of driving. There is a need to increase the temperature of the battery 36 prior to a start of driving, for example, when the temperature Tb of the battery 36 is lower than a temperature-rising target temperature Tb*. A value detected by the temperature sensor 36c is used as the temperature Tb of the battery 36. The temperature-rising target temperature Tb* used may be, for example, 0° C., 5° C. or 10° C.

When the processing routine of FIG. 2 is triggered, the electronic control unit 70 first obtains input data such as a position and a moving speed of the communication device 90, a current location of the vehicle and a current time Tnw (step S100). The position of the communication device 90 is a position that is received by the GPS antenna 94 of the communication device 90 and that is input from the communication device 90 by communication. The moving speed of the communication device 90 is a variation in position of the communication device 90 per unit time that is calculated and input. For example, when the user rides on a train or a bus and makes a reservation of the electric vehicle 20 for driving, the input moving speed of the communication device 90 is not equal to a value 0. The current location of the vehicle is a position that is received by the GPS antenna 64 of the navigation system 60 and that is input from the navigation system 60 by communication. The input current time Tnw is a time on a clock (system clock) (not shown).

After obtaining the input data, the electronic control unit 70 estimates a distance L between the communication device 90 and the vehicle, based on the position of the communication device 90, the current location of the vehicle, and the map information input from the navigation system 60 (step S110). The electronic control unit 70 subsequently estimates a driving start time Tst, based on the estimated distance L between the communication device 90 and the vehicle, the moving speed of the communication device 90 and the current time Tnw (step S120). The processing of step S120 estimates the driving start time Tst, such that the shorter distance L between the communication device 90 and the vehicle provides the earlier driving start time Tst and that the higher moving speed of the communication device 90 toward the current location of the vehicle provides the earlier driving start time Tst.

The electronic control unit 70 subsequently obtains input data such as the temperature Tb of the battery 36, weather information and a driving record (step S130). The input temperature Tb of the battery 36 is a temperature detected by the temperature sensor 36c. The input weather information is information received by the VICS (registered trademark) antenna 65 (for example, an average temperature from the current time Tnw to the driving start time Tst at the current location of the vehicle). The input driving record includes, for example, output or no output of high power from the battery 36 during a previous trip (from an ignition on time to an ignition off time) and a time period from the ignition off time in the previous trip to the driving start time Tst.

After obtaining the input data, the electronic control unit 70 estimates a tentative temperature-rising required time Thttmp as a tentative value of a temperature-rising required time Tht that is required for increasing the temperature of the battery 36 (step S140). A concrete procedure of this processing estimates the tentative temperature-rising required time Thttmp according to Expression (1) given below by using a temperature difference (Tb*−Tb) between the temperature Tb of the battery 36 and the temperature-rising target temperature Tb*, a mass Mb and a specific heat Hb of the battery 36 and a heating energy Eh of the temperature raising device 40.

$$Thttmp = Mb \cdot Hb \cdot (Tb^* - Tb)/Eh \quad (1)$$

The electronic control unit 70 subsequently corrects the tentative temperature-rising required time Thttmp and estimates the temperature-rising required time Tht by taking into account the weather information (prediction) and the driving record (step S150). The electronic control unit 70 then sets a time prior to the driving start time Tst by the estimated temperature-rising required time Tht as a temperature-rising start time Thtst of the battery 36 (step S160). The processing of step S150 estimates the temperature-rising required time Tht, such that the higher average temperature from the current time Tnw to the driving start time Tst at the current location of the vehicle provides the shorter temperature-rising required time Tht, that the case of output of high power from the battery 36 during the previous trip provides the shorter temperature-rising required time Tht, compared with the case of no output of high power, and that the shorter time period from the ignition off time in the previous trip to the driving start time Tst provides the shorter temperature-rising required time Tht. A time period of about several minutes to several hours is generally set as the temperature-rising required time Tht.

When the temperature-rising start time Thtst comes (step S170), the electronic control unit 70 starts driving the temperature raising device 40 (step S180) and then terminates this routine. The temperature raising device 40 that is started in this manner is stopped when the temperature Tb of the battery 36 becomes equal to or higher than the temperature-rising target temperature Tb*.

Increasing the temperature of the battery 36 as described above causes the temperature Tb of the battery 36 to become close to the temperature-rising target temperature Tb* at the driving start time Tst. As a result, this configuration enables the temperature of the battery 36 to be increased appropriately in the case where an unspecified user makes a reservation of the electric vehicle 20 for driving without setting the driving start time Tst.

As described above, when the user operates the communication device 90 to make a reservation of the electric vehicle 20 for driving via the server 100, the electric vehicle 20 of the embodiment estimates the driving start time Tst of the vehicle based on the position of the communication device 90, sets the temperature-rising start time Thtst of the battery 36 based on the temperature Tb of the battery 36 and the estimated driving start time Tst, and uses the temperature raising device 40 to start increasing the temperature of the battery 36 at the temperature-rising start time Thtst. This configuration enables the temperature of the battery 36 to be increased appropriately in the case where an unspecified user makes a reservation of the electric vehicle 20 for driving without setting the driving start time Tst.

When the temperature Tb of the batter 36 detected by the temperature sensor 36c is lower than the temperature-rising target temperature Tb* at the time of the user's operation of the communication device 90 to make a reservation of the electric vehicle 20 for driving via the server 100, the electric vehicle 20 of the embodiment determines that there is a need to increase the temperature of the battery 36 prior to a start of driving. A modification may determine that there is a need to increase the temperature of the battery 36 prior to a start of driving, when an estimated temperature of the battery 36 at the driving start time Tst is calculated based on the weather information and the like and the calculated estimated temperature of the battery 36 is lower than the temperature-rising target temperature Tb*.

The electric vehicle 20 of the embodiment estimates the driving start time Tst, based on the position and the moving speed of the communication device 90. According to a modification, the driving start time Tst may be estimated, based only the position of the communication device 90.

The electric vehicle 20 of the embodiment estimates the temperature-rising required time Tht, based on the temperature Tb of the battery 36, the weather information and the driving record. According to a modification, the temperature-rising required time Tht may be estimated, based on the temperature Tb of the battery 36 and the weather information. According to another modification, the temperature-rising required time Tht may be estimated, based on the temperature Tb of the battery 36 and the driving record. According to another modification, the temperature-rising required time Tht may be estimated, based on only the temperature Tb of the battery 36. The temperature Tb of the battery 36 may be an estimated temperature of the battery 36 at the driving start time Tst based on the weather information and the like, in place of the value detected by the temperature sensor 36c at the time of a reservation of the electric vehicle 20 for driving.

Figure 3:
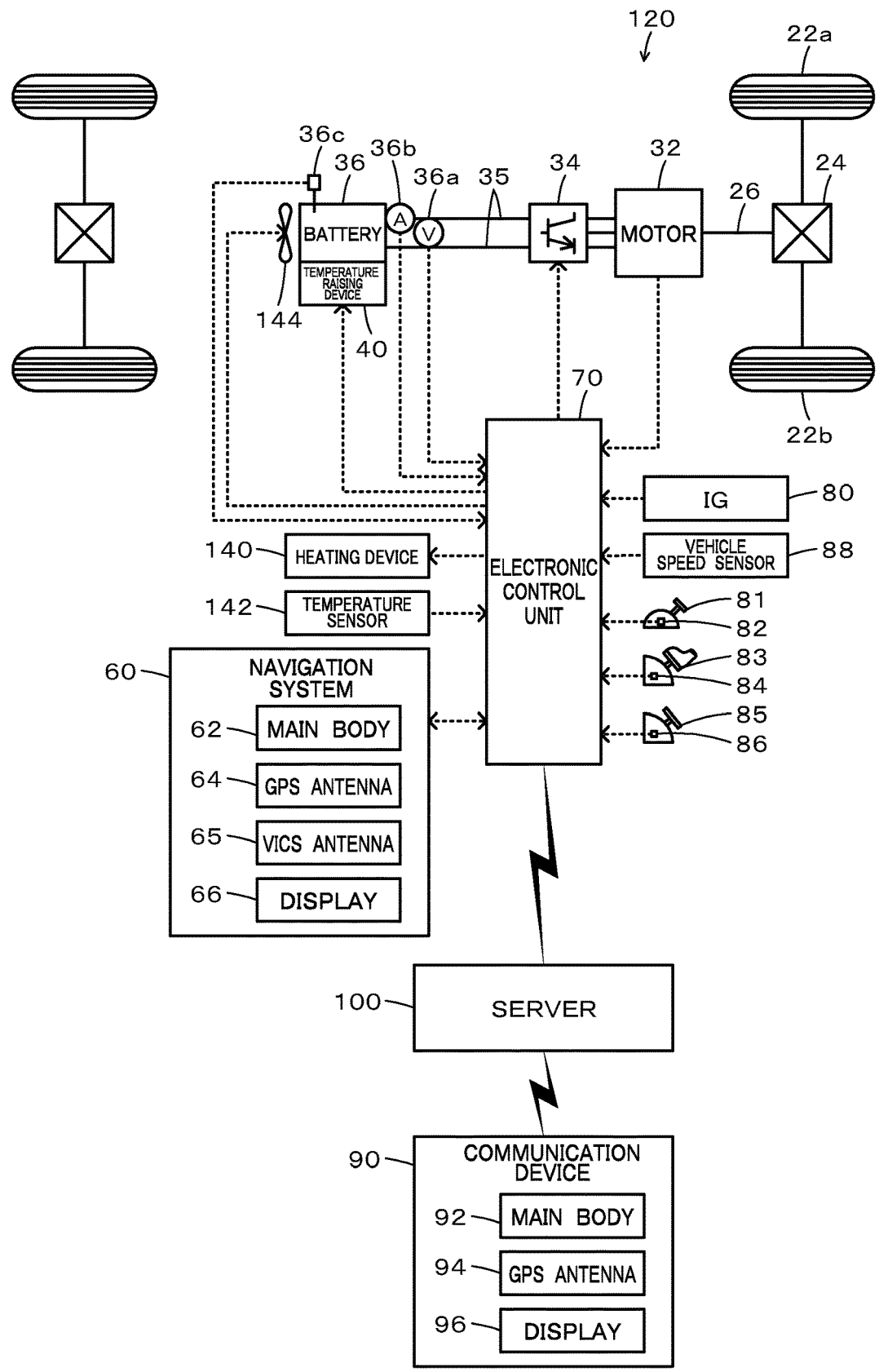
FIG. 3 is a configuration diagram illustrating the schematic configuration of an electric vehicle according to a modification.

The above embodiment describes the electric vehicle 20 having the configuration shown in FIG. 1. The present disclosure is also applicable to an electric vehicle 120 according to a modification having a configuration shown in FIG. 3. The electric vehicle 120 shown in FIG. 3 has a similar configuration to the configuration of the electric vehicle 20 shown in FIG. 1, except that the electric vehicle 120 is additionally provided with a heating device 140, a temperature sensor 142 and a fan 144. Like components of the electric vehicle 120 to the components of the electric vehicle 20 are expressed by like reference signs and their detailed description is omitted.

The heating device 140 uses electric power from an auxiliary machine battery (not shown) to heat the vehicle interior. The temperature sensor 142 is placed in the vehicle interior and is configured to detect a temperature Tpc in the vehicle interior and output the detected temperature Tpc to the electronic control unit 70. The fan 144 uses the electric power from the auxiliary machine battery (not shown) to blow the air in the vehicle interior to the battery 36.

Figure 4:
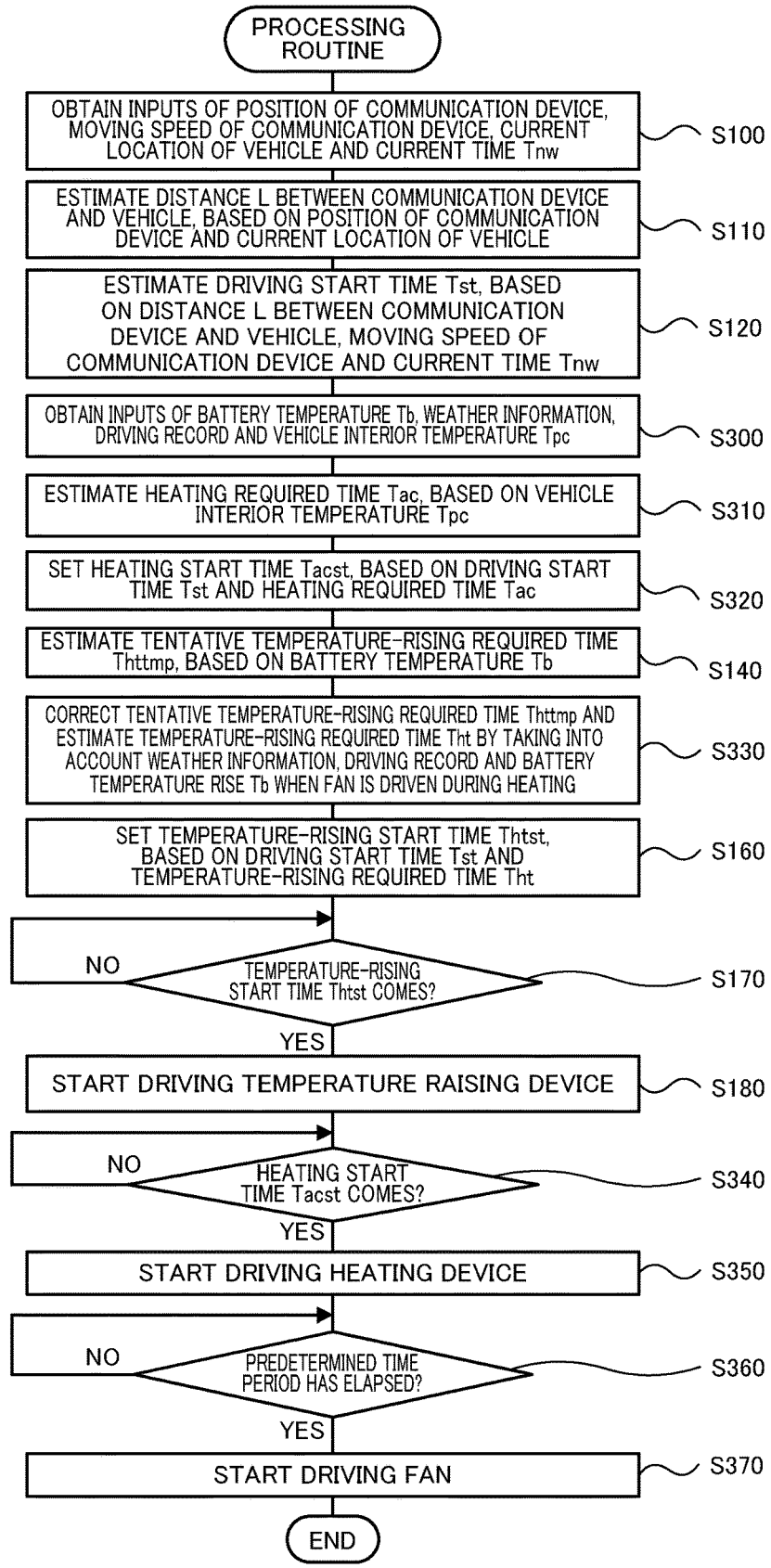
FIG. 4 is a flowchart showing one example of a processing routine performed by the electronic control unit according to the modification.

The following describes the operations of the electric vehicle 120 according to the modification having the configuration described above. FIG. 4 is a flowchart showing one example of a processing routine performed by the electronic control unit 70 according to the modification. This routine is performed when the user operates the communication device 90 to make a reservation of the electric vehicle 120 for driving and to give a pre-heating instruction via the server 100 and there is a need to increase the temperature of the battery 36 prior to a start of driving. The processing routine of FIG. 4 is similar to the processing routine of FIG. 2, except omission of the processing of steps S130 and S150 and addition of the processing of steps S300 to S370. The like processing steps in the processing routine of FIG. 4 to the processing steps in the processing routine of FIG. 2 are expressed by the like step numbers and their detailed description is omitted.

When the processing routine of FIG. 4 is triggered, the electronic control unit 70 estimates the driving start time Tst (steps S100 to S120) and obtains inputs of the temperature Tb of the battery 36 and the temperature Tpc in the vehicle interior (step S300). The input temperature Tb of the battery 36 is described above. The input temperature Tpc in the vehicle interior is a temperature detected by the temperature sensor 142.

After obtaining the input data, the electronic control unit 70 estimates a heating required time Tac, based on the temperature Tpc in the vehicle interior (step S310), and sets a time prior to the driving start time Tst by the estimated heating required time Tac, to a heating start time Tacst (step S320). The processing of step S310 estimates the heating required time Tac, based on a temperature difference (Tpc*−Tpc) between the temperature Tpc in the vehicle interior and a target temperature Tpc*. The target temperature Tpc* may be a temperature received from the communication device 90 (i.e., a temperature set by the user) or may be a temperature set in advance. A time period of about several minutes to ten minutes is generally set as the heating required time Tac.

The electronic control unit 70 subsequently estimates the tentative temperature-rising required time Thttmp of the battery 36 (step S140) and then corrects the tentative temperature-rising required time Thttmp and estimates the temperature-rising required time Tht by taking into account the weather information (prediction), the driving record, and a temperature rise ΔTb (prediction) of the battery 36 in the case where the fan 144 is driven during heating in the vehicle interior (at steps S360 and S370 described later) (step S330). The electronic control unit 70 subsequently sets a time prior to the driving start time Tst by the temperature-rising required time Tht, to the temperature-rising start time Tst of the battery 36 (step S160).

The processing of step S330 estimates the temperature-rising required time Tht, such that the higher average temperature from the current time Tnw to the driving start time Tst at the current location of the vehicle provides the shorter temperature-rising required time Tht, that the case of output of high power from the battery 36 during a previous trip provides the shorter temperature-rising required time Tht, compared with the case of no output of high power, that the shorter time period from the ignition off time in the previous trip to the driving start time Tst provides the shorter temperature-rising required time Tht, and that the higher temperature rise ΔTb of the battery 36 when the fan 144 is driven during heating in the vehicle interior provides the shorter temperature-rising required time Tht. A time period of about several minutes to several hours is generally set as the temperature-rising required time Tht. The description of this routine is on the assumption that the heating required time Tac is shorter than the temperature-rising required time Tht, i.e., on the assumption that the heating start time Tacst is later than the temperature-rising start time Thtst.

When the temperature-rising start time Thtst comes (step S170), the electronic control unit 70 starts driving the temperature raising device 40 (step S180). When the heating start time Tacst comes (step S340), the electronic control unit 70 starts driving the heating device 140 (step S350). When a predetermined time Tset has elapsed since the start of driving the heating device 140 (step S360), the electronic control unit 70 starts driving the fan 144 (step S370) and then terminates this routine. After that, the electronic control unit 70 stops the temperature raising device 40 and the fan 144 when the temperature Tb of the battery 36 becomes equal to or higher than the temperature-rising target temperature Tb*. The electronic control unit 70 stops the heating device 140 when the temperature Tpc in the vehicle interior becomes equal to the target temperature Tpc*.

Increasing the temperature of the battery 36 and heating the vehicle interior as described above cause the temperature Tb of the battery 36 to become close to the temperature-rising target temperature Tb* and cause the temperature Tpc in the vehicle interior to become close to the target temperature Tpc* at the driving start time Tst. As a result, this configuration enables the temperature of the battery 36 to be increased appropriately and enables the vehicle interior to be pre-heated appropriately in the case where an unspecified user makes a reservation of the electric vehicle 20 for driving and gives a pre-heating instruction without setting the driving start time Tst.

According to this modification, the temperature-rising required time Tht is estimated, based on the temperature Tb of the battery 36, the weather information (prediction), the driving record, and the temperature rise ΔTb of the battery 36 (prediction) when the fan 144 is driven during heating in the vehicle interior. According to another modification, the temperature-rising required time Tht may be estimated, based on the temperature Tb of the battery 36 and the temperature rise ΔTb of the battery 36 when the fan 144 is driven during heating in the vehicle interior, without taking into account the weather information (prediction) and the driving record.

The user operates the communication device 90 to make a reservation of the electric vehicle 20 of the embodiment or the electric vehicle 120 of the modification for driving via the server 100. According to a modification, the user may operate the communication device 90 to make a reservation of the electric vehicle for driving without using a server.

The electric vehicle 20 of the embodiment or the electric vehicle 120 of the modification uses the battery 36 as the power storage device. The power storage device used may be a capacitor, in place of the battery 36.

The above embodiment and the above modification respectively describe the electric vehicle 20 and the electric vehicle 120 provided with the motor 32 for driving, the battery 36 and the temperature raising device 40. The present disclosure is, however, applicable to an electrically driven vehicle of any configuration provided with the power storage device and the temperature raising device. For example, the present disclosure may be applied to a parallel hybrid vehicle or a series hybrid vehicle provided with an engine, in addition to the motor 32, the battery 36 and the temperature raising device 40 or may be applied to a fuel cell vehicle provided with a fuel cell, in addition to the motor 32, the battery 36 and the temperature raising device 40.

In the electrically driven vehicle of the above aspect, the control device may estimate the driving start time, based on the position and a moving speed of the communication device. The electrically driven vehicle of this aspect enables the driving start time to be estimated more appropriately. For example, when the user rides on a train or a bus and makes a reservation of the electrically driven vehicle for driving, the moving speed of the communication device is not equal to a value 0.

In the electrically driven vehicle of the above aspect, the control device may estimate a temperature-rising required time of the power storage device, based on the temperature of the power storage device, and sets the temperature-rising start time of the power storage device, based on the estimated driving start time and the estimated temperature-rising required time. The electrically driven vehicle of this aspect enables the temperature-rising start time to be set by taking into account the temperature-rising required time based on the temperature of the power storage device.

In the electrically driven vehicle of the above aspect in this case, the control device may estimate the temperature-rising required time, based on the temperature of the power storage device, weather information and a driving record. The electrically driven vehicle of this aspect enables the temperature-rising required time to be estimated more appropriately. The "weather information" may be, for example, an average temperature from a current time to a driving start time at a current location of the vehicle. The "driving record" may be, for example, output or no output of high power from the power storage device during a previous trip or a time period from an ignition off time of the previous trip to the driving start time.

The electrically driven vehicle of the above aspect may further include a heating device configured to heat a vehicle interior, and a fan configured to blow the air in the vehicle interior to the power storage device. When the user operates the communication device to make a reservation of the electrically driven vehicle for driving and to give a pre-heating instruction, the control device may control the heating device such that a temperature in the vehicle interior becomes equal to a target temperature at the driving start time, and control the fan to blow the air in the vehicle interior to the power storage device. The electrically driven vehicle of this aspect enables the temperature of the power storage device to be increased appropriately and enables the vehicle interior to be pre-heated appropriately in the case where an unspecified user makes a reservation of the electrically driven vehicle for driving and gives a pre-heating instruction without setting the driving start time.

The following describes the correspondence relationship between the primary elements of the above embodiment and the primary elements of the disclosure described in Summary. The battery 36 of the embodiment corresponds to the "power storage device", the temperature raising device 40 corresponds to the "temperature raising device", the electronic control unit 70 corresponds to the "control device", the heating device 140 corresponds to the "heating device", and the fan 144 corresponds to the "fan".

The correspondence relationship between the primary components of the embodiment and the primary components of the present disclosure, regarding which the problem is described in Summary, should not be considered to limit the components of the present disclosure, regarding which the problem is described in Summary, since the embodiment is only illustrative to specifically describes the aspects of the present disclosure, regarding which the problem is described in Summary. In other words, the present disclosure, regarding which the problem is described in Summary, should be interpreted on the basis of the description in Summary, and the embodiment is only a specific example of the present disclosure, regarding which the problem is described in Summary.

The aspect of the present disclosure is described above with reference to the embodiment. The present disclosure is, however, not limited to the above embodiment but various modifications and variations may be made to the embodiment without departing from the scope of the present disclosure.

INDUSTRIAL APPLICABILITY

The disclosure is applicable to, for example, the manufacturing industries of electrically driven vehicles.

What is claimed is:
1. An electrically driven vehicle, comprising:
   a power storage device;
      a temperature raising device configured to increase temperature of the power storage device; and
      a control device configured to control the temperature raising device,
   the electrically driven vehicle being used for car sharing system, wherein
      when a user operates a communication device to make a direct reservation or an indirect reservation of the electrically driving vehicle for driving, the control device estimates a driving start time of the vehicle, based on a position of the communication device, sets a temperature-rising start time of the power storage device, based on a temperature of the power storage device and the estimated driving start time, and controls the temperature raising device to start a temperature increase of the power storage device at the set temperature-rising start time;
   a heating device configured to heat a vehicle interior; and
   a fan configured to blow the air in the vehicle interior to the power storage device, wherein
when the user operates the communication device to make a reservation of the electrically driven vehicle for driving and to give a pre-heating instruction, the control device controls the heating device such that a temperature in the vehicle interior becomes equal to a target temperature at the driving start time, and controls the fan to blow the air in the vehicle interior to the power storage device.

2. The electrically driven vehicle according to claim 1, wherein the control device estimates the driving start time, based on the position and a moving speed of the communication device.

3. The electrically driven vehicle according to claim 1, wherein the control device estimates a temperature-rising required time of the power storage device, based on the temperature of the power storage device, and sets the temperature-rising start time of the power storage device, based on the estimated driving start time and the estimated temperature-rising required time.

4. The electrically driven vehicle according to claim 2, wherein the control device estimates a temperature-rising required time of the power storage device, based on the temperature of the power storage device, and sets the temperature-rising start time of the power storage device, based on the estimated driving start time and the estimated temperature-rising required time.

5. The electrically driven vehicle according to claim 3, wherein the control device estimates the temperature-rising required time, based on the temperature of the power storage device, weather information and a driving record.

6. The electrically driven vehicle according to claim 4, wherein the control device estimates the temperature-rising required time, based on the temperature of the power storage device, weather information and a driving record.

7. An electrically driven vehicle, comprising:
a power storage device;
a heater configured to increase temperature of the power storage device; and
an electronic control unit including a CPU, a memory and input and output ports, the electronic control unit configured to control the temperature raising device,
the electrically driven vehicle being used for car sharing system, wherein
when a user operates a GPS communication unit to make a direct reservation or an indirect reservation of the electrically driving vehicle for driving, the electronic control unit estimates a driving start time of the vehicle, based on a position of the GPS communication unit, sets a temperature-rising start time of the power storage device, based on a temperature of the power storage device and the estimated driving start time, and controls the temperature raising device to start a temperature increase of the power storage device at the set temperature-rising start time;
a vehicle heater configured to heat a vehicle interior; and
a fan configured to blow the air in the vehicle interior to the power storage device,
wherein
when the user operates the communication device to make a reservation of the electrically driven vehicle for driving and to give a pre-heating instruction, the electronic control unit controls the vehicle heater such that a temperature in the vehicle interior becomes equal to a target temperature at the driving start time, and controls the fan to blow the air in the vehicle interior to the power storage device.

8. The electrically driven vehicle according to claim 7, wherein the electronic control unit estimates the driving start time, based on the position and a moving speed of the communication device.

9. The electrically driven vehicle according to claim 8, wherein the electronic control unit estimates a temperature-rising required time of the power storage device, based on the temperature of the power storage device, and sets the temperature-rising start time of the power storage device, based on the estimated driving start time and the estimated temperature-rising required time.

10. The electrically driven vehicle according to claim 9, wherein the electronic control unit estimates the temperature-rising required time, based on the temperature of the power storage device, weather information and a driving record.

11. The electrically driven vehicle according to claim 7, wherein the electronic control unit estimates a temperature-rising required time of the power storage device, based on the temperature of the power storage device, and sets the temperature-rising start time of the power storage device, based on the estimated driving start time and the estimated temperature-rising required time.

12. The electrically driven vehicle according to claim 11, wherein the electronic control unit estimates the temperature-rising required time, based on the temperature of the power storage device, weather information and a driving record.

* * * * *